United States Patent Office 3,458,434
Patented July 29, 1969

3,458,434
PROCESS FOR TREATING SEWAGE
Philip W. Peter, 128 San Diego,
San Clemente, Calif. 92672
No Drawing. Filed Feb. 24, 1966, Ser. No. 529,658
Int. Cl. C02c 1/10, 1/06; C02b 1/82
U.S. Cl. 210—7                               11 Claims

ABSTRACT OF THE DISCLOSURE

A process for treating sewage containing oxidizable suspended solid particles coated with oily films impervious to destruction by aeration, in which the film is destroyed by chemical reduction either by a chemical reducing agent or by electrolysis and the particles are concurrently oxidized by aeration.

---

This invention relates to the treatment of sewage and particularly its aeration.

As received at a sewage plant, sewage from the usual urban area is a liquid containing somewhere around 0.1% of suspended, finely divided organic and inorganic solid matter. In the plant, the sewage is first subjected to a primary treatment in which the heavier solids are removed by sedimentation. In any case, this primary treatment is followed by chloridation or other disinfection and disposal of the sludge removed in the sedimentation. The effluent from the primary treatment contains waste, mostly in the form of suspended organic solids, and also bacteria, which, if discharged in the outflow from the plant, will cause pollution of any but a very large body of water. It therefore is the usual practice to subject the effluent or waste liquor from the primary treatment to a secondary treatment in which it is aerated by passing or pumping air through it to kill harmful bacteria and oxidize any oxidizable matter so that the latter will settle out or be convetred into harmless forms.

The oxidation of the oxidizable solids in the secondary treatment is due in part to the direct chemical action of the oxygen but in the main to digestion by aerobic microorganisms to which the waste liquor is exposed. Satisfaction of the chemical and biochemical demands of the suspended solid matter for oxygen depends primarily upon the availability of molecular oxygen dissolved with the air in the liquid. Raw sewage, when fresh, contains some dissolved oxygen but this is insufficient to supply the demands and is consumed in a matter of several hours, leaving the sewage devoid of oxygen or oxygen dead. If the demands are to be met, more air thus must be supplied and this is the recognized reason for the aeration.

It has not previously been recognized that the neutral hydrocarbon oils and saponifiable and nonsaponifiable greases, fats and the like, invariably contained in urban sewage, in the presence of the liquid or water carrier, will prevent oxidation of a substantial part of the oxidizabe matter by forming on adjoining solid particles a film or coating that is impervious to destruction by aeration, whether the aeration is conducted under atmospheric or relatively high pressure. It is with the destruction of these films, hereinafter termed collectively "oily," "neutral oil" or sometimes neutral hydrocarbon oil" films or coatings and the exposure to oxidation of the particles initially contained therein, that the present invention is concerned.

The primary object of the present invention is to provide a process for treating sewage whereby by subjecting the sewage to chemical reduction any oily films coating particles are destroyed and the particles therein exposed for chemical or biochemical oxidation.

Another object of the invention is to provide a process for treating sewage wherein the sewage is subjected to chemical reduction by a chemical reducing agent or electrolysis to destroy oily films coating any solid particles and concurrently is aerated in the presence of aerobic microorganisms capable of promoting biochemical oxidation, thereby chemically or biochemically oxidizing oxidizable solid matter in the sewage, including initially coated particles and removing the oxidized matter by sedimentation or conversion into harmless forms.

Other objects and advantages of the invention will appear hereinafter in the detailed description and be particularly pointed out in the appended claims.

The process of this invention for treating sewage comprises basically the subjection of sewage to chemical reduction in order to destroy oily films coating any particles and expose those particles for oxidation either directly by chemical action or indirectly by biochemical action on digestion by suitable microorganisms. The reduction can be either chemical by the introduction into the sewage of suitable chemical reducing agents, such as sodium thiosulfate, or electrolytic by passing through the sewage between suitable electrodes a direct or alternating current. The reduction can be conducted either prior to aeration, as during or immediately following the primary sedimentation treatment, or concurrently with the aeration, the latter usually being the more convenient.

If, as preferred, the reduction is conducted in the secondary treatment, the oily films coating particles in the waste liquor, effluent or sewage from the primary sedimentation treatment will be reduced chemically to destroy them by the chemical action of a suitable chemical reducing agent added to the waste liquor or the electrochemical action of electrolysis produced by passing through the waste liquor a direct or alternating current. Concurrently, the waste liquor will be aerated by introducing air into it in any suitable manner, as by blowing, pumping or forcing air through it or trickling it over rocks. In accordance with usual practice, the waste liquor will be exposed or subjected during the aeration to digestion by microorganisms capable of producing biochemical oxidation and either grown or introduced into the tank or other contained space in which the aeration is conducted. On oxidation, a large part of the solid matter initially suspended in the waste liquor will be converted into a form in which it will settle out of the liquor and be removed by sedimentation. The resultant sediment, known as aerated or activated sludge, can all be added to or disposed of with the unactviated sludge removed in the primary treatment or, for the benefit in promoting oxidation and settling, part of the activated sludge can be recycled into the waste liquor from the primary treatment or even into the raw sewage entering the plant.

The suspended solid matter, the demands of which are responsible for the avidity of raw sewage for oxygen, is divisible into three classes. The first and most avid user is carbonaceous organic material biochemically oxidizable by microorganisms, the second, biochemically oxidizable nitrogeneous compounds, both inorganic and organic, oxidizable by such microorganisms as nitrosomonas and nitrobacter, and the third, directly oxidizable chemical compounds. Although otherwise oxidizable, particles of solids of any of these classes cannot be oxidized by aeration when they are coated with oily films which are impervious to molecular oxygen. Since such coated particles usually make up a substantial percentage of the solid matter suspended in the sewage and not only are not oxidizable but usually will not settle, it is vital that they be exposed to oxidation if the pollution of the water into which the outflow from the treating plant is discharged, is to be reduced to a minimum.

Although intended primarily for application during the secondary treatment of the sewage to minimize pollution by the outflow from the treating plant, the destruction of the oily films by chemical reducion, can be applied with advantage as an aid to the chemical or biochemical digestion of the sludge from the primary treatment or to the digested sludge itself, to facilitate the disposal of solid particles coated with oily films.

The manner in which the process is conducted in a sewage treatment plant will depend on whether the chemical reduction by which the oily films are to be destroyed is to be produced by the chemical action of an added reducing agent or the electrochemical action of electrolysis. Thus, in a plant in which the waste liquor or effluent from the primary treatment is aerated by forcing air through it in an aeration tank, the oily films can be destroyed by chemical reaction by adding sodium thiosulfate or other suitable reducing salt or chemical reducing agent to the waste liquor in the aeration tank in an amount preferably sufficient to bring the E.M.F. of the liquor to about −460 mv. Concurrently, the liquor will be aerated by forcing air through it, the volume and pressure of the air and duration of the aeration following the usual practice for aeration in the particular plant. During the aeration further quantities of the reducing agent should be added either continuously or from time to time as necessary to keep the E.M.F. balanced. While it is preferable to continue the rdeuction for the duration of the aeration, it can be ended sooner, with a reduction period of at least fifteen minutes about the practical minimum.

So conducted, the chemical reduction will destroy the oily films coating any solid particles and expose the latter for attack by the introduced oxygen, either directly by chemical action or indirectly by the biochemical action promoted by the special microorganisms present for the purpose in the tank. The exposure of the previously non-oxidizable particles to attack by the oxygen not only increases the efficiency of the aeration but appears to cause the oxygen to act more rapidly on all of these oxidizable material, as indicated by a very definite increase in the settling rate.

In electrochemically reducing the waste liquor from the primary treatment in a plant in which, as in the foregoing example, the liquor is aerated in an aeration tank, a series of preferably carbon or acceptably iron or other suitable metal electrodes are installed in such manner that the anodes and cathodes are staggered. Usually the waste liquor, as is, will be sufficiently conductive for the reduction but, if necessary, a suitable electrolyte can be added. Spacing will depend upon the current used, a 2 ft. spacing being suitable for a 30 v. DC input. The size and number of the plates will depend upon the size of the tank and the depth of the liquor in the particular installation, with the selected size such that the current will be effectively distributed through the liquor and the number sufficient for the 30 v. DC or other DC or AC input to maintain the E.M.F. of the liquor at the preferred level of about −460 mv. The duration of the reduction required to destroy oily films will be the same for the electrochemical action as for the chemical reaction of the first example.

If in the particular plant the secondary treatment is conducted in both primary and secondary aeration tanks or chambers, the chemical reduction should be conducted in at least the primary tank and can be conducted in both. In plants in which the underflow from the primary clarifiers is subjected to so-called "liquid burning," in which the oxidation is conducted under pressure, the chemical reaction can be conducted in the same pressure vessel or vessels but it will ordinarily be more convenient to conduct electrochemical reduction in one or more separate receptacles in advance of the pressure vessels.

When sewage is aerated, molecular oxygen is dissolved in the liquor and it is this oxygen, known as demand oxygen or D.O., upon which the various classes of oxidizable solids in the sewage depend primarily to satisfy their demands. Consequently, up to the point at which these demands are fully satisfied, the less the demand oxygen content, the more nearly satisfied are the demands of the potential oxygen users. A comparison of the dissolved oxygen contents of two samples taken from the same batch of sewage and aerated in the same manner, except that one was also subjected to reduction, would therefore indicate the relative efficiencies of conventional aeration and the improved aeration of the present process.

On the above basis, a series of laboratory tests were conducted in glass containers upon 500 ml. samples of fresh raw sewage taken from the same batches, in each of which two samples from the same batch were aerated in exactly the same way and for the same length of time but only one was subjected to reduction. The source of the aeration was an aquarium pump, the reduction was continued for the duration of the aeration and the time of the aeration varied from about 15 minutes to about 35 minutes. In the tests of reduction by chemical reaction, 10 ml. of .025 N sodium thiosulfate was added to each sample to be reduced. In the case of the reduction by electrochemical action, the electrodes used were 14 gauge, ¼" opening stainless steel wire mesh, approximately 3" square, which were set about 1" apart and had a lead wire to each from the current source. The applied current was either 16 v. DC or 110 v. AC. Rather than apply them to waste liquor from the primary treatment, the tests were applied to fresh raw sewage to give to give straight aeration the benefit of the dissolved oxygen initially contained in the sewage.

In every test, except one, the dissolved oxygen content of the samples subjected to reduction was less than that of the unreduced comparison sample, the decrease ranging from a minimum of 7.5% to a maximum of over 30%. In the one exception, the reduced sample was subjected to a 16 v. DC current for 30 minutes and the reduced sample had about 300% the dissolved oxygen content of the unreduced sample, indicating that in the reduced sample the oxygen demands of the potential users had been fully satisfied and thereafter the dissolved oxygen content had increased substantially to the saturation point.

Another series of tests run on bulking or oxygen dead activated sludge to compare settling rates with and without reduction and using samples of the same quantity and the same amount of .025 N sodium thiosulfate and the same 16 v. DC and 110 v. AC input currents as in the D.O. tests, showed for the unreduced sludge a settling rate of about 5.75% in 15 minutes and a rate for the reduced samples running from a minimum of 8% to a maximum of 37% in 15 minutes, the latter using 110 v. AC. A continuation of the 110 v. AC test for another 15 minutes showed a further increase in the settling rate to 70%.

As the above tests indicated, chemical reduction chemical reaction or electrochemical action is effective to destroy oily films coating solid particles in sewage and by exposing the particles to oxygen, permits the rapid chemical or biochemical oxidation of any that are oxidizable. In turn, this aids in the flocculation of the solid matter in the sewage and promotes rapid settling of organic matter, thus affording a more rapid and complete removal of solid matter from sewage by aeration than has heretofore been possible.

From the above detailed description it will be apparent that there has been provided an improved process for treating sewage which markedly increases the efficiency of aeration and reduces to a minimum the pollution of water by outflow from sewage treatment plants. It should be understood that the described embodiments are merely exemplary of the invention and that all modifications are intended to be included that do not depart from the spirit of the invention and the scope of the appended claims.

Having described my invention, I claim:

1. A process for treating sewage containing oxidizable suspended solid particles coated with oily films impervious to destruction by aeration, comprising chemically destroying said oily films by chemical reduction of said films to expose said particles for oxidation and concurrently aerating said sewage to oxidize said exposed particles by satisfying the oxygen demands thereof.

2. A process according to claim 1 including aerating the sewage under pressure.

3. A process according to claim 1 wherein the reduction is chemically produced by the reaction of the films with a chemical reducing agent.

4. A process according to claim 3 wherein sodium thiosulfate is the chemical reducing agent.

5. A process according to claim 1 wherein the reduction is electrochemically produced by subjecting the films to electrolysis.

6. A process according to claim 5 wherein the electrolytic reduction is produced by passing direct current through the sewage.

7. A process according to claim 5 wherein the electrolytic reduction is produced by passing alternating current through the sewage.

8. A process according to claim 1 including aerating the sewage in the presence of microoorganisms capable of promoting biochemical oxidation for oxidizing chemically and biochemically oxidizable solid matter in the sewage including the particles exposed for oxidation by the reduction.

9. A process according to claim 8 wherein the sewage is waste liquor from a primary sedimentation treatment.

10. A process according to claim 8 wherein any activated sludge settling out of the sewage as a result of the aeration is removed and in part recycled into unaerated sewage.

11. A process according to claim 8 wherein the sewage is aerated under pressure.

References Cited

UNITED STATES PATENTS

| | | | |
|---|---|---|---|
| 744,171 | 11/1903 | Davis et al. | 204—152 |
| 763,026 | 6/1904 | Schweitzer | 204—152 X |
| 1,746,964 | 2/1930 | Polatsik | 204—269 |
| 2,305,549 | 12/1949 | Nixon | 252—330 X |
| 3,054,602 | 9/1962 | Proudman | 210—220 X |
| 3,336,220 | 8/1967 | Neidl | 210—14 |
| 3,220,706 | 11/1965 | Valdespino | 210—15 X |
| 3,271,304 | 9/1966 | Valdespino et al. | 210—15 |

OTHER REFERENCES

Mahlie, W. S.: Oil and Grease in Sewage, Sewage Works Journal, vol. 12, May 1940, pp. 527, 532–535, 539–543 and 554–556 relied on (posl.).

Babbitt, H. E.: Sewerage and Sewage Treatment, sixth edition, 1947, John Wiley & Sons, New York, pp. 385 and 454 relied on (copy in gp. 176).

Metcalf, L., et al.: American Sewerage Practice, vol. III, Disposal of Sewage, 1935, McGraw-Hill, New York, p. 135 (copy in gp. 176).

MICHAEL E. ROGERS, Primary Examiner

U.S. Cl. X.R.

204—149; 210—15, 18